(12) United States Patent
Wang et al.

(10) Patent No.: US 11,720,629 B2
(45) Date of Patent: Aug. 8, 2023

(54) KNOWLEDGE GRAPH CONSTRUCTION METHOD AND DEVICE

(71) Applicant: GUANGDONG SHENMA SEARCH TECHNOLOGY CO., LTD., Guangzhou (CN)

(72) Inventors: Yue Wang, Guangzhou (CN); Wei You, Guangzhou (CN); Weixing Zhang, Guangzhou (CN); Nengwei Hua, Guangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 1363 days.

(21) Appl. No.: 16/034,799

(22) Filed: Jul. 13, 2018

(65) Prior Publication Data
US 2019/0019088 A1 Jan. 17, 2019

(30) Foreign Application Priority Data
Jul. 14, 2017 (CN) .......................... 201710576164.2

(51) Int. Cl.
*G06F 16/335* (2019.01)
*G06F 16/901* (2019.01)
(Continued)

(52) U.S. Cl.
CPC .......... *G06F 16/9024* (2019.01); *G06F 18/00* (2023.01); *G06F 18/22* (2023.01);
(Continued)

(58) Field of Classification Search
CPC .......... G06N 5/02; G06N 5/003; G06N 5/022; G06F 16/9024; G06F 16/3335;
(Continued)

(56) References Cited

U.S. PATENT DOCUMENTS 6,687,404 B1 * 2/2004 Hull ...................... G06V 30/40
382/226
7,542,969 B1 * 6/2009 Rappaport .......... G06F 16/3338
(Continued)

FOREIGN PATENT DOCUMENTS

| CN | 104462501 A | 3/2015 |
| CN | 105574098 A | 5/2016 |

(Continued)

OTHER PUBLICATIONS

First Examination Report dated Jan. 20, 2021, issued in related Indian Application No. 201844025680 (7 pages).
(Continued)

*Primary Examiner* — Philip P. Dang (57) ABSTRACT

The present invention provides a knowledge graph construction method and device. The method includes: obtaining structured data, where the structured data includes a first entity name of a first entity and attribute information corresponding to the first entity name, and the attribute information includes a first attribute and a first attribute value; performing, based on measurement of a similarity between the first entity and a second entity in a knowledge graph, entity alignment processing on the first entity, where the measurement of the similarity includes at least one of the following types: measurement of a character similarity, measurement of a structure similarity of a classification tree on which an entity is located, and measurement of an attribute similarity; and importing the structured data into the knowledge graph according to an entity alignment processing result. Embodiments may ensure correctness of data in the knowledge graph.

18 Claims, 4 Drawing Sheets

(51) Int. Cl.
*G06N 5/02* (2023.01)
*G06N 5/022* (2023.01)
*G06F 18/00* (2023.01)
*G06F 18/22* (2023.01)
*G06F 18/243* (2023.01)
*G06N 5/01* (2023.01)

(52) U.S. Cl.
CPC ......... *G06F 18/24323* (2023.01); *G06N 5/01* (2023.01); *G06N 5/02* (2013.01); *G06N 5/022* (2013.01)

(58) Field of Classification Search
CPC ....... G06F 16/335; G06F 16/367; G06K 9/62; G06K 9/6215; G06K 9/6282
See application file for complete search history.

(56) References Cited

U.S. PATENT DOCUMENTS

| | | | | |
|---|---|---|---|---|
| 8,122,047 | B2* | 2/2012 | Kanigsberg | G06Q 30/0625 |
| | | | | 707/765 |
| 8,356,036 | B2* | 1/2013 | Bechtel | G16H 50/70 |
| | | | | 707/748 |
| 8,615,524 | B2 | 12/2013 | Kanigsberg et al. | |
| 8,713,021 | B2* | 4/2014 | Bellegarda | G06F 18/2413 |
| | | | | 707/739 |
| 8,805,861 | B2* | 8/2014 | Boyan | G06F 16/958 |
| | | | | 707/798 |
| 8,873,813 | B2* | 10/2014 | Tadayon | G06V 40/172 |
| | | | | 382/118 |
| 8,930,178 | B2* | 1/2015 | Pestian | G16H 70/60 |
| | | | | 704/10 |
| 9,081,501 | B2* | 7/2015 | Asaad | G06F 15/76 |
| 9,104,979 | B2 | 8/2015 | Kiciman et al. | |
| 9,535,902 | B1* | 1/2017 | Michalak | G06F 16/3331 |
| 9,548,799 | B2* | 1/2017 | Hsu | H04L 7/033 |
| 9,558,265 | B1* | 1/2017 | Tacchi | G06F 16/338 |
| 9,721,563 | B2* | 8/2017 | Naik | G10L 15/187 |
| 9,916,538 | B2* | 3/2018 | Zadeh | A61B 5/165 |
| 11,080,336 | B2* | 8/2021 | Van Dusen | G06F 16/90335 |
| 11,170,306 | B2* | 11/2021 | Ozcan | G06N 20/00 |
| 2002/0052858 | A1* | 5/2002 | Goldman | G06N 5/025 |
| | | | | 706/15 |
| 2009/0299999 | A1 | 12/2009 | Loui et al. | |
| 2010/0189316 | A1* | 7/2010 | Walch | G06V 30/18181 |
| | | | | 382/187 |
| 2011/0119243 | A1* | 5/2011 | Diamond | G06F 16/9535 |
| | | | | 707/706 |
| 2011/0137919 | A1* | 6/2011 | Ryu | G06F 16/9024 |
| | | | | 707/794 |
| 2012/0016877 | A1* | 1/2012 | Vadrevu | G06F 16/35 |
| | | | | 707/E17.089 |
| 2012/0143911 | A1* | 6/2012 | Liebald | G06F 16/435 |
| | | | | 707/771 |
| 2012/0246154 | A1* | 9/2012 | Duan | G06F 16/2455 |
| | | | | 707/E17.014 |
| 2012/0290571 | A1* | 11/2012 | Lee | G06Q 50/184 |
| | | | | 707/769 |
| 2013/0166547 | A1* | 6/2013 | Pasumarthi | G06Q 10/06 |
| | | | | 707/E17.014 |
| 2014/0046921 | A1* | 2/2014 | Bau | G06F 16/951 |
| | | | | 707/738 |
| 2014/0156634 | A1* | 6/2014 | Buchmann | G06F 16/24544 |
| | | | | 707/714 |
| 2015/0235143 | A1* | 8/2015 | Eder | G16Z 99/00 |
| | | | | 706/12 |
| 2015/0286709 | A1* | 10/2015 | Sathish | G06Q 10/06 |
| | | | | 706/45 |
| 2015/0286713 | A1* | 10/2015 | Zhang | G06F 16/367 |
| | | | | 707/749 |
| 2015/0324464 | A1* | 11/2015 | Fan | G06F 16/29 |
| | | | | 707/737 |
| 2016/0098433 | A1* | 4/2016 | Lightner | G06F 16/24578 |
| | | | | 707/741 |

FOREIGN PATENT DOCUMENTS

| | | |
|---|---|---|
| CN | 106156082 A | 11/2016 |
| CN | 106447346 A | 2/2017 |

OTHER PUBLICATIONS

Second Office Action dated Dec. 14, 2020, issued in related Chinese Application No. 201710576164.2, with English machine translation (18 pages).
Second Examination Report dated Dec. 20, 2021, issued in related Indonesian Application No. PID201805069, with English machine translation (4 pages).
First Search dated May 26, 2020, issued in related Chinese Application No. 201710576164.2 (2 pages).
First Office Action dated Jun. 3, 2020, issued in related Chinese Application No. 201710576164.2, with English machine translation (18 pages).
Office Action dated Oct. 20, 2020, issued in related Indonesian Application No. PID201805069, with English translation (4 pages).

* cited by examiner

KNOWLEDGE GRAPH CONSTRUCTION METHOD AND DEVICE

CROSS REFERENCE TO RELATED APPLICATION

The present application claims priority to and benefits of Chinese Application No. 201710576164.2, filed on Jul. 14, 2017, the entire content of which is incorporated herein by reference in its entirety.

TECHNICAL FIELD

The present invention relates to the field of information search technologies, and in particular, to a knowledge graph construction method and device.

BACKGROUND

With rapid development of information technologies, the current society has entered an information explosion era, and people seek, increasingly with the help of a network, information that they need. Currently, to provide a more precise search service to a user, a knowledge graph is increasingly applied to the field of search.

Knowledge graph has been developed, which aim to describe various entities existing in a real world and a relationship among them. After a knowledge graph is established, and a user enters a keyword, associated information such as an attribute of this keyword, and a relationship between this keyword and another entity may be returned to the user. In this way, needed information may be more accurately and thoroughly provided to the user. Therefore, in a knowledge graph construction process, how to ensure accuracy of data in the knowledge graph becomes especially important.

SUMMARY

Embodiments of the present invention provide a knowledge graph construction method and device, so as to improve accuracy of data in a knowledge graph.

According to a first aspect, the present invention provides a knowledge graph construction method, including obtaining structured data, where the structured data includes a first entity name of a first entity and attribute information corresponding to the first entity name, and the attribute information includes a first attribute and a first attribute value, performing, based on measurement of a similarity between the first entity and a second entity in a knowledge graph, entity alignment processing on the first entity, where the measurement of the similarity includes at least one of the following types: measurement of a character similarity, measurement of a structure similarity of a classification tree on which an entity is located, and measurement of an attribute similarity, and importing the structured data into the knowledge graph according to an entity alignment processing result.

Optionally, the performing, based on measurement of a similarity between the first entity and a second entity in a knowledge graph, entity alignment processing on the first entity includes: determining, according to a type of a data source of the structured data, a measurement type for similarity measurement between the first entity and the second entity in the knowledge graph, and performing entity alignment processing on the first entity according to the determined measurement type.

Optionally, the type of the data source is a data source based on a classification tree, and the measurement type includes measurement of a structure similarity of a classification tree on which an entity is located. The performing entity alignment processing on the first entity according to the determined measurement type includes determining, in the knowledge graph, that the data source is a second entity of a classification tree, and determining whether a child node and a parent node of the first entity are the same as a child node and a parent node of the second entity; and if yes, determining that the entities are aligned, and if not, determining that the entities are not aligned.

Optionally, the type of the data source is a data source not based on a classification tree, and the measurement type includes measurement of a character similarity. The performing entity alignment processing on the first entity according to the determined measurement type includes: determining whether a character similarity between the first entity name and the second entity name in the knowledge graph is greater than a preset threshold; and if yes, determining that the entities are aligned, and if not, determining that the entities are not aligned.

Optionally, the type of the data source is a data source not based on a classification tree, the measurement type includes measurement of an attribute similarity, and the first attribute includes a key attribute and a non-key attribute. The performing entity alignment processing on the first entity according to the determined measurement type includes: determining whether a second attribute the same as the key attribute exists in the knowledge graph, and if yes, determining whether attribute values corresponding to the key attribute and the second attribute are the same; and if yes, determining that the entities are aligned, and if not, determining that the entities are not aligned.

Optionally, the importing the structured data into the knowledge graph according to an entity alignment processing result includes: determining, when the entity alignment processing result is that the first entity is aligned with the second entity, and attribute alignment processing is performed on the first attribute of the first entity and a second attribute of the second entity, whether a second attribute the same as the first attribute exists in the knowledge graph; if not, mapping the first attribute and the first attribute value to the second entity; or if yes, when the first attribute is a single-value attribute, determining whether the first attribute value corresponding to the first attribute conflicts with a second attribute value corresponding to the second attribute, and if not, performing deduplication processing, or if yes, when a reliability degree of the first attribute value is higher than a reliability degree of the second attribute value, mapping the first attribute value to the second entity, and deleting the second attribute value; or when the first attribute is a multi-value attribute, and a plurality of first attribute values do not conflict with a second attribute value, determining, in the plurality of first attribute values, an attribute value different from the second attribute value, and mapping a plurality of different first attribute values to the second entity; and when the entity alignment processing result is that the first entity is unaligned with the second entity, newly constructing a graph item in the knowledge graph, where the newly constructed graph item includes the first entity name and the first attribute value corresponding to the first attribute.

Optionally, before the determining, according to a type of a data source of the structured data, a measurement type for performing similarity processing between the first entity and the second entity in the knowledge graph, the method further includes: obtaining a description type of each piece of attribute information, and performing cleansing and normalization processing on each piece of attribute information according to a standard description statement corresponding to the description type, so that attribute information being semantically the same has the same description.

Optionally, the method further includes: in the knowledge graph, for a second attribute used to represent a relationship between entities, determining an implied relationship between entities by using a preset chain rule, and mapping the implied relationship to the knowledge graph.

According to a second aspect, the present disclosure provides a knowledge graph construction device, including: a data obtaining module, configured to obtain structured data, where the structured data includes a first entity name of a first entity and attribute information corresponding to the first entity name, and the attribute information includes a first attribute and a first attribute value, an alignment processing module, configured to perform, based on measurement of a similarity between the first entity and a second entity in a knowledge graph, entity alignment processing on the first entity, where the measurement of the similarity includes at least one of the following types: measurement of a character similarity, measurement of a structure similarity of a classification tree on which an entity is located, and measurement of an attribute similarity, and a data importing module, configured to import the structured data into the knowledge graph according to an entity alignment processing result.

Optionally, the alignment processing module is specifically configured to determine, according to a type of a data source of the structured data, a measurement type for performing similarity processing between the first entity and the second entity in the knowledge graph, and perform entity alignment processing on the first entity according to the determined measurement type.

Optionally, the type of the data source is a data source based on a classification tree, and the measurement type includes measurement of a structure similarity of a classification tree on which an entity is located. The alignment processing module is specifically configured to determine, in the knowledge graph, that the data source is a second entity of a classification tree, and determine whether a child node and a parent node of the first entity are the same as a child node and a parent node of the second entity; and if yes, determine that the entities are aligned, and if not, determine that the entities are not aligned.

Optionally, the type of the data source is a data source not based on a classification tree, and the measurement type includes measurement of a character similarity. The alignment processing module is specifically configured to determine whether a character similarity between the first entity name and the second entity name in the knowledge graph is greater than a preset threshold; and if yes, determine that the entities are aligned, and if not, determine that the entities are not aligned.

Optionally, the type of the data source is a data source not based on a classification tree, the measurement type includes measurement of an attribute similarity, and the first attribute includes a key attribute and a non-key attribute. The alignment processing module is specifically configured to determine whether a second attribute the same as the key attribute exists in the knowledge graph, and if yes, determine whether attribute values corresponding to the key attribute and the second attribute are the same; and if yes, determine that the entities are aligned, and if not, determine that the entities are not aligned.

Optionally, the data importing module is specifically configured to determine, when the entity alignment processing result is that the first entity is aligned with the second entity, and attribute alignment processing is performed on the first attribute of the first entity and a second attribute of the second entity, whether a second attribute the same as the first attribute exists in the knowledge graph;

if not, map the first attribute and the first attribute value to the second entity; or if yes, when the first attribute is a single-value attribute, determine whether the first attribute value corresponding to the first attribute conflicts with a second attribute value corresponding to the second attribute, and if not, perform deduplication processing, or if yes, when a reliability degree of the first attribute value is higher than a reliability degree of the second attribute value, map the first attribute value to the second entity, and delete the second attribute value; or when the first attribute is a multi-value attribute, and a plurality of first attribute values do not conflict with a second attribute value, determine, in the plurality of first attribute values, an attribute value different from the second attribute value, and map a plurality of different first attribute values to the second entity; and when the entity alignment processing result is that the first entity is unaligned with the second entity, newly construct a graph item in the knowledge graph, where the newly constructed graph item includes the first entity name and the first attribute value corresponding to the first attribute.

Optionally, the device further includes: a cleansing processing module, configured to obtain a description type of each piece of attribute information, and perform cleansing and normalization processing on each piece of attribute information according to a standard description statement corresponding to the description type, so that attribute information being semantically the same has the same description.

Optionally, the device further includes: a reasoning module, configured to: in the knowledge graph, for a second attribute used to represent a relationship between entities, determine an implied relationship between entities by using a preset chain rule, and map the implied relationship to the knowledge graph.

According a third aspect, the present disclosure further provides a knowledge graph construction device, comprising a processor and a non-transitory computer-readable storage medium storing instructions that, when execute by the processor, cause the processor to perform a method for constructing a knowledge graph. The method comprises obtaining structured data, wherein the structured data comprises a first entity name of a first entity and attribute information corresponding to the first entity name, and the attribute information comprises a first attribute and a first attribute value, performing, based on measurement of a similarity between the first entity and a second entity in a knowledge graph, entity alignment processing on the first entity, wherein the measurement of the similarity comprises at least one of the following types: measurement of a character similarity, measurement of a structure similarity of a classification tree on which an entity is located, and measurement of an attribute similarity, and importing the structured data into the knowledge graph according to an entity alignment processing result.

According a fourth aspect, the present disclosure further provides a non-transitory computer-readable storage medium storing instructions that, when execute by a processor, cause the processor to perform a method for constructing a knowledge graph. The method comprises obtaining structured data, wherein the structured data comprises a first entity name of a first entity and attribute information corresponding to the first entity name, and the attribute information comprises a first attribute and a first attribute value, performing, based on measurement of a similarity between the first entity and a second entity in a knowledge graph, entity alignment processing on the first entity, wherein the measurement of the similarity comprises at least one of the following types: measurement of a character similarity, measurement of a structure similarity of a classification tree on which an entity is located, and measurement of an attribute similarity, and importing the structured data into the knowledge graph according to an entity alignment processing result.

Based on the knowledge graph construction method and device provided in the embodiments, structured data is obtained, and entity alignment processing is performed, based on measurement of a similarity between a first entity and a second entity in a knowledge graph, on the first entity, where the measurement of the similarity includes at least one of the following types: measurement of a character similarity, measurement of a structure similarity of a classification tree on which an entity is located, and measurement of an attribute similarity. By using measurement types of these similarities, correctness of an entity alignment result may be ensured, correct structured data can be imported into the knowledge graph, to prevent erroneous or redundant data from being imported into the knowledge graph, and improve accuracy of the knowledge graph, and an accurate search result can be provided to a user.

BRIEF DESCRIPTION OF THE DRAWINGS

To describe the technical solutions in the embodiments of the present invention or in the prior art more clearly, the following briefly introduces the accompanying drawings required for describing the embodiments of the present invention or the prior art. Apparently, the accompanying drawings in the following description show some embodiments of the present invention, and a person of ordinary skill in the art may derive other drawings from these accompanying drawings without creative efforts.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Figure 1:
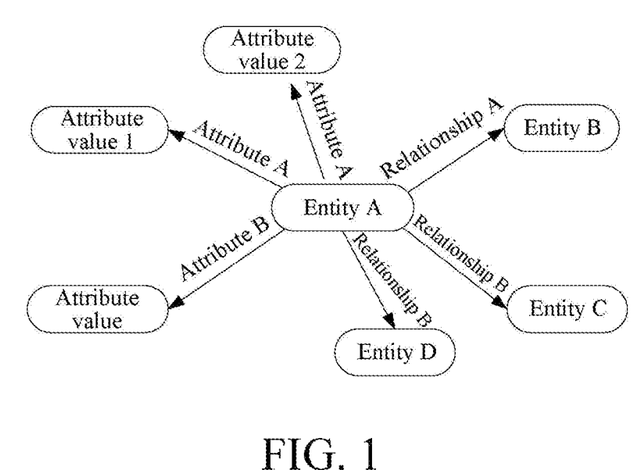
FIG. 1 is a schematic structural diagram of a knowledge graph according to one embodiment of the present invention.

FIG. 1 is a schematic structural diagram of a knowledge graph according to one embodiment of the present invention. The knowledge graph is used to describe various entities existing in a real world and a relationship among them. The knowledge graph includes attributes and attribute values of entities and a relationship among the entities. The knowledge graph may be considered as a huge diagram, where a node indicates an entity, and a line is formed by an attribute or a relationship. For example, FIG. 1 shows an attribute and an attribute value of an entity A, and an entity B, an entity C, and an entity D that have a relationship with the entity A.

Figure 2:
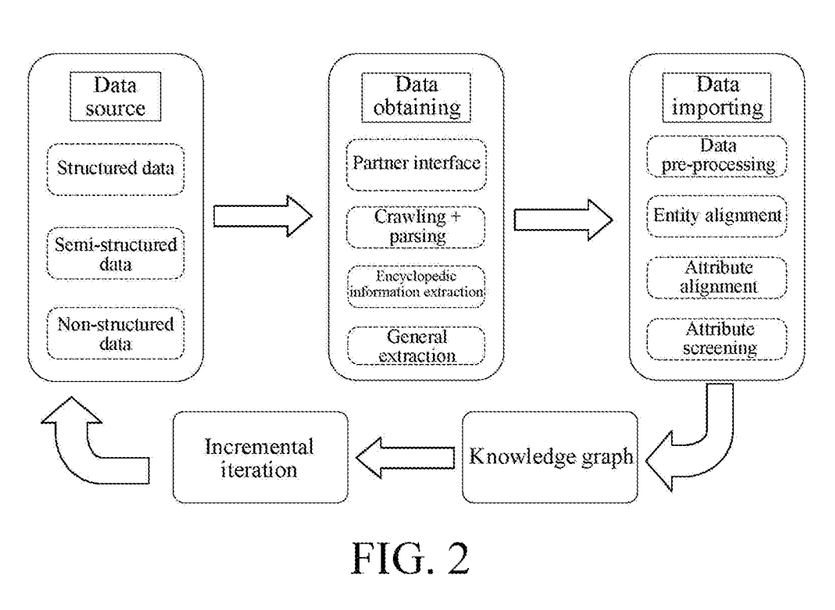
FIG. 2 is a diagram of an overall framework for constructing a knowledge graph according to one embodiment of the present invention.

FIG. 2 is a diagram of an overall framework for constructing a knowledge graph according to an embodiment of the present invention. As shown in FIG. 2, in a process of constructing the knowledge graph shown in FIG. 1, the overall framework includes three parts: a data source, data obtaining, and data importing.

The data source is a source of data for constructing the knowledge graph. The data source includes structured data, for example, structured data provided by a vertical website or the like; semi-structured data, for example, an encyclopedia or a list; and non-structured data, for example, web page data in a text form.

The data obtaining is obtaining data from the data source, and an obtaining manner includes directly obtaining information about a vertical website from a partner's interface; obtaining, in a manner of crawling in combination with parsing, data from a vertical website, a semi-structured website, or the like; extracting encyclopedic information; generally extracting web page data in a text form; and the like. Data obtained in this embodiment includes structured data, semi-structured data, and non-structured data. Semi-structured data and non-structured data are converted into structured data in such a manner as template matching. A specific implementation of the structured data is not particularly limited in this embodiment.

In this embodiment, the data imported into the knowledge graph is structured data. The data importing process relates to processes on the structured data such as pre-processing, entity alignment, attribute alignment, and attribute screening, and structured data satisfying a condition is finally imported into the knowledge graph. Subsequently, continuable update and extension of the knowledge graph are ensured in such a manner as incremental iteration. In the following embodiments, for description convenience, entities are distinguished, an entity in obtained structured data is referred to as a first entity that corresponds to a first attribute and a first attribute value, and an entity existing in a knowledge graph is referred to as a second entity that corresponds to a second attribute and a second attribute value. A process of constructing the knowledge graph is described in detail below by using detailed embodiments.

Figure 3:
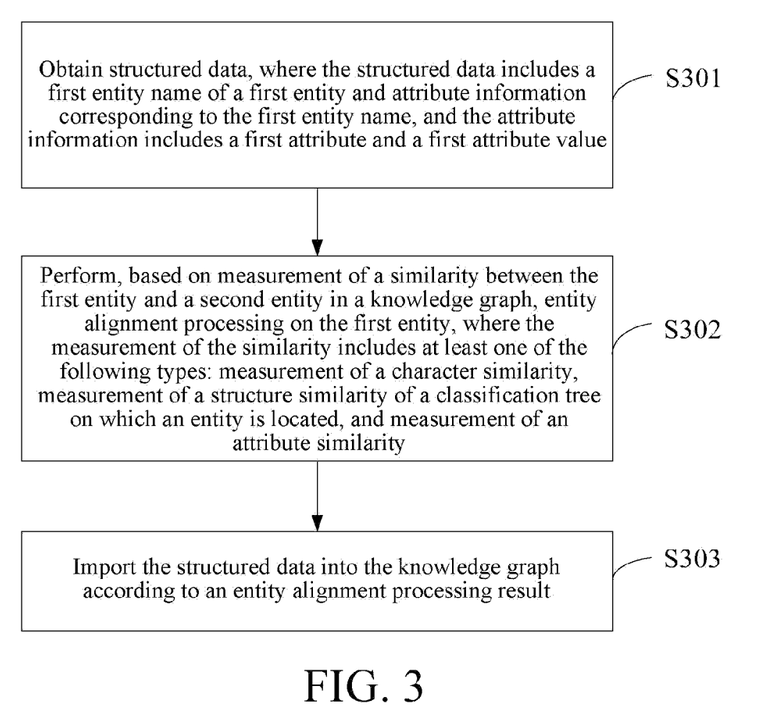
FIG. 3 is a flowchart of a knowledge graph construction method according to one embodiment of the present invention.

FIG. 3 is a flowchart of a knowledge graph construction method according to an embodiment of the present invention. As shown in FIG. 3, the method includes the following steps.

S301. Obtain structured data, where the structured data includes a first entity name of a first entity and attribute information corresponding to the first entity name, and the attribute information includes a first attribute and a first attribute value.

For a specific implementation of obtaining structured data, refer to the embodiment shown in FIG. 2. Details are not described again in this embodiment. The structured data includes the first entity name of the first entity and the attribute information corresponding to the first entity name. The attribute information includes the first attribute and the first attribute value. In this embodiment, the first attribute has two meanings.

One meaning is: the first attribute is a self attribute of the first entity, the self attribute may be a height, a weight, or the like of the first entity, and the corresponding first attribute value is an attribute value corresponding to the self attribute, for example, a specific height value and weight value. In the knowledge graph, line information is used to indicate the self attribute of the first entity. There may be a plurality of self attributes of the first entity, and each self attribute may also correspond to a plurality of attribute values.

The other meaning is: the first attribute is an attribute of a relationship between the first entity and the second entity, the relationship attribute may be couple, children, parent, friend, or the like, and the corresponding first attribute value is another entity having a relationship with the first entity. In the knowledge graph, line information is used to indicate a relationship between the first entity and another entity. The first entity may correspond to a plurality of relationship attributes, and each relationship attribute may correspond to a plurality of other entities.

S302. Perform, based on measurement of a similarity between the first entity and a second entity in a knowledge graph, entity alignment processing on the first entity, where the measurement of the similarity includes at least one of the following types: measurement of a character similarity, measurement of a structure similarity of a classification tree on which an entity is located, and measurement of an attribute similarity.

After the structured data is obtained, at the beginning of creation, if the knowledge graph has no data, the structured data is directly imported into the knowledge graph, so as to form the knowledge graph. When the knowledge graph has data, entity alignment processing is performed on the first entity based on the measurement of the similarity between the first entity and the second entity in the knowledge graph. The entity alignment processing includes determining entities that have different IDs but represent the same object in a real world, and classifying these entities as an entity that has a globally unique identifier, that is, finding the first entity and the second entity that are the same, so as to map the first attribute of the first entity and the corresponding first attribute value to the second entity, that is, adding the first attribute and the corresponding first attribute value on the basis of the second entity.

Optionally, before entity alignment processing is performed, the method further includes a data pre-processing process. Specifically, a description type of each piece of attribute information is obtained; and cleansing and normalization processing is performed on each piece of attribute information according to a standard description statement corresponding to the description type, so that attribute information being semantically the same has the same description.

Specifically, for the same attribute value, data of different sources may be described in different manners. For example, the height is 1.75 meter, and different descriptions include 1.75 m, 1.75 M, 1 meter and 75 centimeters, 175 cm, 175 centimeters, and the like. Cleansing and normalization aim to remove noise in raw data and uniformize data expression forms. In current data cleansing and normalization, different standard description statements are configured for attributes corresponding to different description types, that is, each description type corresponds to a standard description statement. For example, each of date, time, value, nation, city and the like may correspond to a standard description statement.

By pre-processing data, a uniform data description may be ensured, and when entity alignment and attribute alignment are performed, alignment accuracy is ensured.

In this embodiment, the measurement of the similarity includes at least one of the following types: measurement of a character similarity, measurement of a structure similarity of a classification tree on which an entity is located, and measurement of an attribute similarity, that are separately described sequentially below.

1. Measurement of a character similarity. Specifically, whether a character similarity between the first entity name and the second entity name in the knowledge graph is greater than a preset threshold is determined; and if yes, the entities are aligned, and if not, the entities are not aligned.

In a specific implementation process, entities having the same expression may be the same entity. For example, from different vertical house property websites, entities such as Shanghai Greenland Haipo Xinghui, Greenland Haipo Xinghui, Haipo Xinghui, and Haipo Xinghui residence area may be collected, and it may be determined, according to a character similarity between names, that the entities may be the same entity. For example, if the character similarity is greater than a preset threshold, it is determined that the entities are the same entity. Optionally, before the character similarity is determined, a prefix, a suffix, or the like may be further filtered out. For example, a prefix place name and a prefix property developer name are filtered out, and a suffix "residence area" is filtered out.

2. Measurement of a structure similarity of a classification tree on which an entity is located. It is determined, in the knowledge graph, that the data source is a second entity of a classification tree; and whether a child node and a parent node of the first entity are the same as a child node and a parent node of the second entity is determined; and if yes, the entities are aligned, and if not, the entities are not aligned.

In a specific implementation process, entities having the same neighboring node may point to the same entity. When the data source is a classification tree, measurement may be performed by using measurement of a structure similarity. For example, when botanical classification trees are respectively collected from Flora of China and Aihuhua, a parent node and a child node of Fragrant flower and a parent node and a child node of *Osmanthus fragrans* are all the same, and therefore it is determined that the two are the same entity.

3. Measurement of an attribute similarity. In this embodiment, the first attribute includes a key attribute and a non-key attribute; and whether a second attribute the same as the key attribute exists in the knowledge graph is determined, and if yes, whether attribute values corresponding to the key attribute and the second attribute are the same is determined; and if yes, the entities are aligned, and if not, the entities are not aligned.

In a specific implementation process, entities having the same attribute and the same attribute value may represent the same entity. Such similarity measurement manner is usually used to determine alignment of entities having the same name. In an attribute alignment process, alignment is performed by using a key attribute of an entity, the key attribute may be a preset attribute representing uniqueness of the entity, and a non-key attribute is not used as an alignment determining standard. For example, for two "Baolong Squares", if key attributes: detailed addresses, that is, attribute values are the same, it is determined that the two "Baolong Squares" are the same building; and for two "Li Na", if key attributes: birthday information are consistent, it is determined that the two "Li Na" are the same person. A person skilled in the art may understand that, there may be one or more key attributes, and a quantity of key attributes is not particularly limited in this embodiment.

In this embodiment, which similarity is specifically used for measurement may depend on an actual situation, and in different scenarios, there are different applications. For example, only the character similarity may be used, only the attribute similarity may be used, or only the structure similarity may be used.

For another example, two similarities may be further combined to perform implementation. For example, the character similarity is combined with the attribute similarity, measurement of the character similarity may be first performed, and for entities satisfying the character similarity, verification may be performed with reference to measurement of the attribute similarity. For example, characters are similar, but attribute values corresponding to key attributes are different, the entities are not the same entity; and the character similarity may be further combined with the structure similarity, for entities not satisfying the character similarity, measurement of the structure similarity may be performed. For another embodiment in which two similarities are combined, details are not described again in this embodiment.

For another example, three similarities may be further combined to perform implementation. That is, measurement of the structure similarity is first performed, then measurement of the character similarity is performed, then measurement of the attribute similarity is performed, and entity alignment processing is performed by means of mutual supplement and mutual verification between the three similarities.

In a possible implementation, a measurement type for performing similarity processing between the first entity and the second entity in the knowledge graph may be determined according to a type of a data source of the structured data; and entity alignment processing is performed on the first entity according to the determined measurement type.

Specifically, when the type of the data source is a data source based on a classification tree, the measurement type is measurement of a structure similarity of a classification tree on which an entity is located. When the type of the data source is a data source not based on a classification tree, the measurement type is measurement of a character similarity and/or the measurement type is measurement of an attribute similarity.

That is, the type of the data source may be first determined, and the measurement type is determined according to the type of the data source. When the type of the data source is a data source based on a classification tree, measurement of a structure similarity of a classification tree on which an entity is located is first used. Optionally, subsequently, supplement and verification may be further performed by using the character similarity and/or the attribute similarity. When the type of the data source is a data source not based on a classification tree, measurement of a structure similarity is not considered, and measurement of a character similarity and/or measurement of an attribute similarity is selected.

S303. Import the structured data into the knowledge graph according to an entity alignment processing result.

After the entity alignment processing result is obtained, an attribute alignment operation may be further performed on the first entity and the second entity on which entity alignment is performed. Attribute alignment means determining attributes having different descriptions but representing the same attribute in a real world, and classifying these attributes as one attribute. For example, two attributes: birth date and birthday are classified as one attribute that may be indicated by using the birth date.

After entity alignment and attribute alignment, entities may be divided into an aligned entity and an unaligned entity. For the unaligned entity, importing into the graph is performed in an addition manner, and for the aligned entity, it is imported into the knowledge graph by modifying the knowledge graph in different manners such as replacement and supplement, thereby constructing the knowledge graph.

Based on the knowledge graph construction method provided in the embodiments, structured data is obtained, and entity alignment processing is performed, based on measurement of a similarity between a first entity and a second entity in a knowledge graph, on the first entity, where the measurement of the similarity includes at least one of the following types: measurement of a character similarity, measurement of a structure similarity of a classification tree on which an entity is located, and measurement of an attribute similarity. By using measurement types of these similarities, accuracy of an entity alignment result may be ensured, correct structured data can be imported into the knowledge graph, to prevent erroneous or redundant data from being imported into the knowledge graph, and improve accuracy of the knowledge graph, and an accurate search result can be provided to a user.

An implementation process of importing structured data into a knowledge graph by using an attribute screening process after entity alignment and attribute alignment is mainly described below by using a detailed embodiment.

Figure 4:
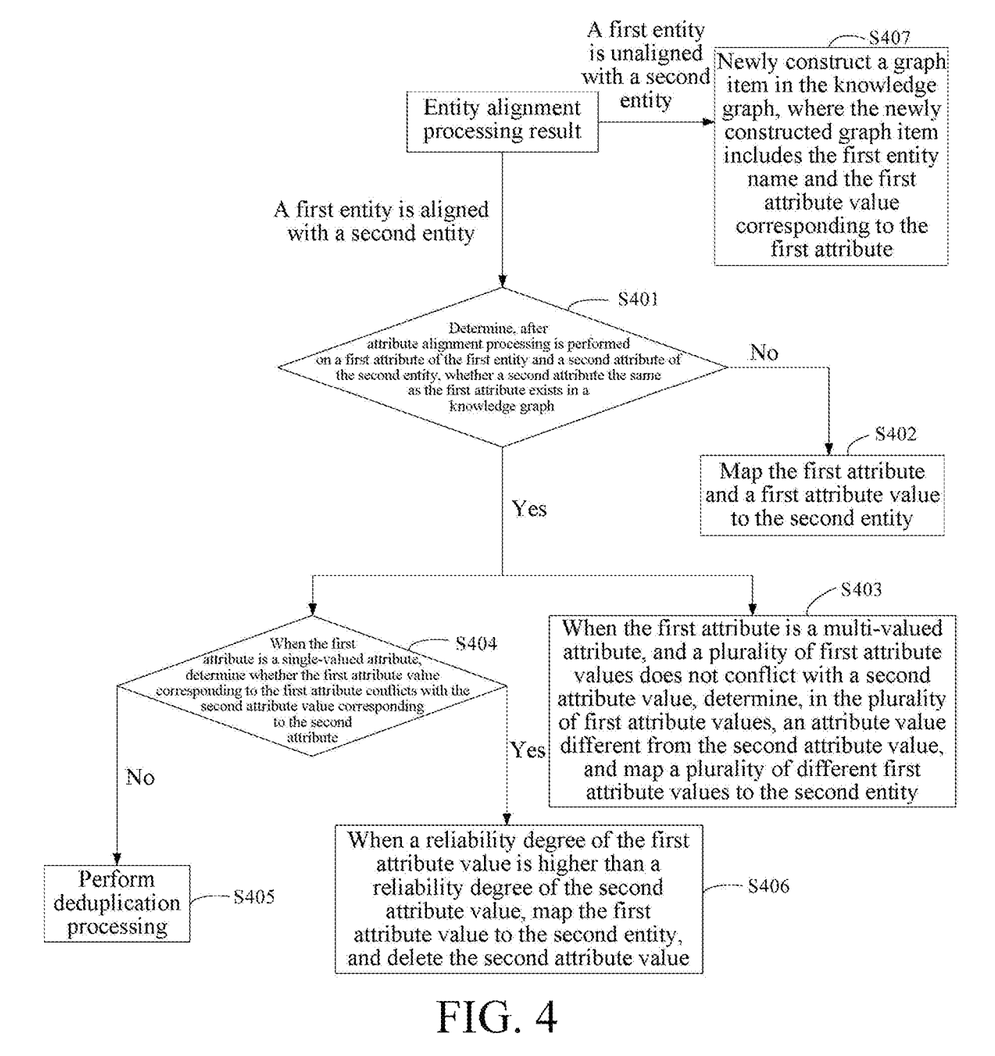
FIG. 4 is a flowchart of a knowledge graph construction method according to one embodiment of the present invention.

FIG. 4 is a flowchart of a knowledge graph construction method according to an embodiment of the present invention. As shown in FIG. 4, the method includes the following steps.

S401. Determine, when an entity alignment processing result is that a first entity is aligned with a second entity, and attribute alignment processing is performed on a first attribute of the first entity and a second attribute of the second entity, whether a second attribute the same as the first attribute exists in a knowledge graph; and if not, perform S402, or if yes, perform S403 or S404.

S402. Map the first attribute and a first attribute value to the second entity.

If the first attribute of the first entity is different from the second attribute of the second entity when the first entity is aligned with the second entity, the first attribute and the first attribute value are mapped to the second entity. For example, if the first entity is Zhang San, the second entity: Zhang San aligned with the Zhang San exists in the knowledge graph, the first attribute is the birth date, and the second attribute of the second entity has no birth date, the first attribute: birth date and a corresponding attribute value are mapped to the second entity in the knowledge graph.

S403. When the first attribute is a multi-value attribute, and a plurality of first attribute values do not conflict with a second attribute value, determine, in the plurality of first attribute values, an attribute value different from the second attribute value, and map a plurality of different first attribute values to the second entity.

When the first attribute is a multi-value attribute, for example, the first attribute is friends or children, when the first entity is aligned with the second entity, and the first attribute of the first entity is the same as the second attribute of the second entity, an attribute value corresponding to the second attribute may be supplemented.

For example, for children of Zhang San, attribute values corresponding to the second attribute are Zhang Yiming and Zhang Erming, and attribute values corresponding to the first attribute are Zhang Yimin, Zhang Sanming, Zhang Siming, and Zhang Xiaoming. Zhang Yiming and Zhang Yimin are two attribute values conflicting with each other, it is determined that Zhang Yiming is a correct attribute value and Zhang Yimin is an erroneous attribute value, Zhang Yimin is deleted, then it is determined that Zhang Sanming, Zhang Siming, and Zhang Xiaoming are attribute values different from the second attribute value, and Zhang Sanming, Zhang Siming, and Zhang Xiaoming are mapped to children of the second attribute: Zhang San.

S404. When the first attribute is a single-value attribute, determine whether the first attribute value corresponding to the first attribute conflicts with the second attribute value corresponding to the second attribute; and if not, perform S405, or if yes, perform S406.

S405. Perform deduplication processing.

S406. When a reliability degree of the first attribute value is higher than a reliability degree of the second attribute value, map the first attribute value to the second entity, and delete the second attribute value.

When the first attribute is a single-value attribute, that is, the first attribute has only one attribute value, whether the first attribute value corresponding to the first attribute conflicts with the second attribute value corresponding to the second attribute is determined. If the two attribute values do not conflict, it indicates that the two attribute values are both correct attribute values, merging and deduplication processing may be performed, to obtain a unique attribute value. When the two attribute values conflict, reliability of the first attribute value and reliability of the second attribute value are determined. If the reliability of the first attribute value is higher than that of the second attribute value, the second attribute value is deleted, or if a reliability degree of the first attribute value is less than that of the second attribute value, the first attribute value is deleted.

The reliability degree may be determined according to frequencies that the first attribute value occurs on different data sources, a preset reliability degree rank of a data source, and the like. A specific implementation of determining a reliability degree is not particularly limited in this embodiment.

S407. When the entity alignment processing result is that the first entity is unaligned with the second entity, newly construct a graph item in the knowledge graph, where the newly constructed graph item includes the first entity name and the first attribute value corresponding to the first attribute.

In this embodiment, a process of importing the structured data into the knowledge graph is fully considered in different situations, to prevent erroneous and repetitive data from being imported into the knowledge graph, and also prevent data from being omitted, thereby ensuring accuracy of the knowledge graph.

On the basis of the foregoing embodiments, this embodiment further provides incremental iteration and continuable construction on the knowledge graph.

In the knowledge graph, for a second attribute used to represent a relationship between entities, an implied relationship between entities can be determined by using a preset chain rule, and the implied relationship can be mapped to the knowledge graph.

For example, a chain rule may be defined in advance: the father-in-law is the father of the wife. By using this rule, when the wife (Ye Li) of Yao Ming and the father (Ye Fa) of Ye Li are known, it may be inferred that the father-in-law of Yao Ming is Ye Fa. Another chain rule is similar to this chain rule, and details are not described again in this embodiment.

In this embodiment, by performing incremental iteration processing on the knowledge graph, knowledge coverage of the knowledge graph is further increased, to ensure that construction of the knowledge graph is a verifiable and continuable increasing process.

Figure 5:
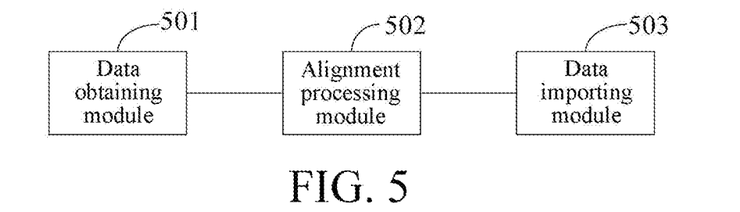
FIG. 5 is a schematic structural diagram of a knowledge graph construction device according to one embodiment of the present invention.

FIG. 5 is a schematic structural diagram of a knowledge graph construction device according to an embodiment of the present invention. As shown in FIG. 5, the device includes:

a data obtaining module 501, configured to obtain structured data, where the structured data includes a first entity name of a first entity and attribute information corresponding to the first entity name, and the attribute information includes a first attribute and a first attribute value;

an alignment processing module 502, configured to perform, based on measurement of a similarity between the first entity and a second entity in a knowledge graph, entity alignment on the first entity, where the measurement of the similarity includes at least one of the following types: measurement of a character similarity, measurement of a structure similarity of a classification tree on which an entity is located, and measurement of an attribute similarity; and a data importing module 503, configured to import the structured data into the knowledge graph according to an entity alignment processing result.

The device provided in this embodiment may be configured to perform the foregoing method embodiment, and the implementation principle and technical effect of the device are similar to those of the method embodiment. Details are not described again in this embodiment.

Figure 6:
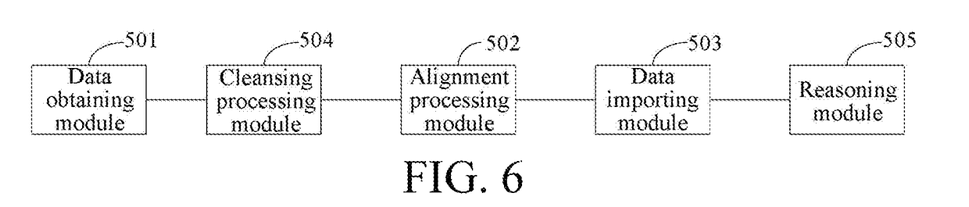
FIG. 6 is a schematic structural diagram of a knowledge graph construction device according to one embodiment of the present invention.

FIG. 6 is a schematic structural diagram of a knowledge graph construction device according to an embodiment of the present invention. This embodiment is on the basis of the embodiment in FIG. 5.

The alignment processing module 502 is specifically configured to determine, according to a type of a data source of the structured data, a measurement type for performing similarity processing between the first entity and the second entity in the knowledge graph; and perform entity alignment processing on the first entity according to the determined measurement type.

Optionally, the type of the data source is a data source based on a classification tree, and the measurement type includes measurement of a structure similarity of a classification tree on which an entity is located; and the alignment processing module 502 is specifically configured to determine, in the knowledge graph, that the data source is a second entity of a classification tree; and determine whether a child node and a parent node of the first entity are the same as a child node and a parent node of the second entity; and if yes, determine that the entities are aligned, and if not, determine that the entities are not aligned.

Optionally, the type of the data source is a data source not based on a classification tree, and the measurement type includes measurement of a character similarity; and the alignment processing module 502 is specifically configured to determine whether a character similarity between the first entity name and the second entity name in the knowledge graph is greater than a preset threshold; and if yes, determine that the entities are aligned, and if not, determine that the entities are not aligned.

Optionally, the type of the data source is a data source not based on a classification tree, the measurement type includes measurement of an attribute similarity, and the first attribute includes a key attribute and a non-key attribute; and the alignment processing module 502 is specifically configured to determine whether a second attribute the same as the key attribute exists in the knowledge graph, and if yes, determine whether attribute values corresponding to the key attribute and the second attribute are the same; and if yes, determine that the entities are aligned, and if not, determine that the entities are not aligned.

Optionally, the data importing module 503 is specifically configured to:

determine, when the entity alignment processing result is that the first entity is aligned with the second entity, and attribute alignment processing is performed on the first attribute of the first entity and a second attribute of the second entity, whether a second attribute the same as the first attribute exists in the knowledge graph;

if not, map the first attribute and the first attribute value to the second entity; or if yes, when the first attribute is a single-value attribute, determine whether the first attribute value corresponding to the first attribute conflicts with a second attribute value corresponding to the second attribute, and if not, perform deduplication processing, or if yes, when a reliability degree of the first attribute value is higher than a reliability degree of the second attribute value, map the first attribute value to the second entity, and delete the second attribute value; or when the first attribute is a multi-value attribute, and a plurality of first attribute values do not conflict with a second attribute value, determine, in the plurality of first attribute values, an attribute value different from the second attribute value, and map a plurality of different first attribute values to the second entity; and when the entity alignment processing result is that the first entity is unaligned with the second entity, newly construct a graph item in the knowledge graph, where the newly constructed graph item includes the first entity name and the first attribute value corresponding to the first attribute.

Optionally, the device further includes: a cleansing processing module 504, configured to obtain a description type of each piece of attribute information; and perform cleansing and normalization processing on each piece of attribute information according to a standard description statement corresponding to the description type, so that attribute information being semantically the same has the same description.

Optionally, the device further includes: a reasoning module 505, configured to: in the knowledge graph, for a second attribute used to represent a relationship between entities, determine an implied relationship between entities by using a preset chain rule, and map the implied relationship to the knowledge graph.

The device provided in this embodiment may be configured to perform the foregoing method embodiment, and an implementation principle and a technical effect of the device are similar to those of the method embodiment. Details are not described again in this embodiment.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to a part or all of the technical features thereof. Such modifications or replacements do not cause the essence of corresponding technical solutions to depart from the scope of the technical solutions of the embodiments of the present invention.

What is claimed is:

1. A computer-implemented knowledge graph construction method, comprising:

obtaining structured data, wherein the structured data comprises a first entity name of a first entity and attribute information corresponding to the first entity name, and the attribute information comprises a first attribute and a first attribute value;

performing, based on a measurement of similarity between the first entity and a second entity in a knowledge graph, entity alignment on the first entity, wherein the measurement of similarity comprises at least one of the following types: measurement of a character similarity, and measurement of an attribute similarity; and importing, the structured data into the knowledge graph based on the entity alignment, wherein the importing comprises:

when the entity alignment indicates that the first entity is aligned with the second entity, and attribute alignment is performed on the first attribute of the first entity and a second attribute of the second entity, determining whether the second attribute exists in the knowledge graph;

if the second attribute does not exist in the knowledge graph, importing the first attribute and the first attribute value to the second entity; and if the second attribute exists in the knowledge graph:

when the first attribute is a single-value attribute, determining whether the first attribute value corresponding to the first attribute conflicts with a second attribute value corresponding to the second attribute, and if the first attribute value does not conflict with the second attribute value, performing deduplication processing;

if the first attribute value conflicts with the second attribute value, when a reliability degree of the first attribute value is higher than a reliability degree of the second attribute value, importing the first attribute value to the second entity, and deleting the second attribute value; or when the first attribute is a multi-value attribute, and comprises a plurality of first attribute values that do not conflict with the second attribute value, determining, in the plurality of first attribute values, an attribute value different from the second attribute value, and importing the determined attribute value to the second entity.

2. The computer-implemented knowledge graph construction method according to claim 1, wherein the performing, based on the measurement of similarity between the first entity and the second entity in the knowledge graph, entity alignment processing on the first entity comprises:
   determining, according to a type of a data source of the structured data, a measurement type for performing similarity processing between the first entity and the second entity in the knowledge graph; and
   performing entity alignment processing on the first entity according to the determined measurement type.

3. The computer-implemented knowledge graph construction method according to claim 2, wherein
   the performing entity alignment processing on the first entity according to the determined measurement type comprises:
   determining whether a child node and a parent node of the first entity are the same as a child node and a parent node of the second entity; and if yes, determining that the entities are aligned, and if not, determining that the entities are not aligned.

4. The computer-implemented knowledge graph construction method according to claim 2, wherein
   the performing entity alignment processing on the first entity according to the determined measurement type comprises:
   determining whether a character similarity between the first entity name and the second entity name in the knowledge graph is greater than a preset threshold; and if yes, determining that the entities are aligned, and if not, determining that the entities are not aligned.

5. The computer-implemented knowledge graph construction method according to claim 2, wherein the first attribute comprises a key attribute and a non-key attribute; and
   the performing entity alignment processing on the first entity according to the determined measurement type comprises:
   determining whether the second attribute exists in the knowledge graph, and if yes, determining whether attribute values corresponding to the key attribute and the second attribute are the same; and if yes, determining that the entities are aligned, and if not, determining that the entities are not aligned.

6. The computer-implemented knowledge graph construction method according to claim 1, wherein before the determining, according to a type of a data source of the structured data, a measurement type for performing similarity processing between the first entity and the second entity in the knowledge graph, the method further comprises:
   obtaining a description type of each piece of attribute information; and
   performing cleansing and normalization processing on each piece of attribute information according to a standard description statement corresponding to the description type, so that attribute information being semantically the same has the same description.

7. The computer-implemented knowledge graph construction method according to claim 1, wherein the method further comprises:
   in the knowledge graph, for a second attribute used to represent a relationship between entities, determining an implied relationship between entities by using a preset chain rule, and mapping the implied relationship to the knowledge graph.

8. A knowledge graph construction device, comprising a processor and a non-transitory computer-readable storage medium storing instructions that, when execute by the processor, cause the processor to perform a method comprising:
   obtaining structured data, wherein the structured data comprises a first entity name of a first entity and attribute information corresponding to the first entity name, and the attribute information comprises a first attribute and a first attribute value;
   performing, based on a measurement of similarity between the first entity and a second entity in a knowledge graph, entity alignment processing on the first entity, wherein the measurement of similarity comprises at least one of the following types: measurement of a character similarity, and measurement of an attribute similarity; and
   importing the structured data into the knowledge graph based on the entity alignment, wherein the importing comprises:
      when the entity alignment indicates that the first entity is aligned with the second entity, and attribute alignment is performed on the first attribute of the first entity and a second attribute of the second entity, determining whether the second attribute exists in the knowledge graph;
      if the second attribute does not exist in the knowledge graph, importing the first attribute and the first attribute value to the second entity; and
      if the second attribute exists in the knowledge graph:
         when the first attribute is a single-value attribute, determining whether the first attribute value corresponding to the first attribute conflicts with a second attribute value corresponding to the second attribute, and
            if the first attribute value does not conflict with the second attribute value, performing deduplication processing, or if the first attribute value conflicts with the second attribute value, when a reliability degree of the first attribute value is higher than a reliability degree of the second attribute value, importing the first attribute value to the second entity, and deleting the second attribute value; or
         when the first attribute is a multi-value attribute, and comprises a plurality of first attribute values that do not conflict with the second attribute value, determining, in the plurality of first attribute values, an attribute value different from the second attribute value, and importing the determined attribute value to the second entity.

9. The knowledge graph construction device according to claim 8, wherein the method further comprises: determining, according to a type of a data source of the structured data, a measurement type for performing similarity processing between the first entity and the second entity in the knowledge graph; and
   performing entity alignment processing on the first entity comprises performing entity alignment processing on the first entity according to the determined measurement type.

10. The knowledge graph construction device according to claim 9, wherein the performing entity alignment processing on the first entity comprises:
   determining whether a child node and a parent node of the first entity are the same as a child node and a parent node of the second entity; and if yes, determining that the first entity and second entity are aligned, and if not, determining that the first entity and second entity are not aligned.

11. The knowledge graph construction device according to claim 9, wherein the performing entity alignment processing on the first entity comprises:
determining whether a character similarity between the first entity name and the second entity name in the knowledge graph is greater than a preset threshold; and if yes, determining that the first entity and second entity are aligned, and if not, determining that the first entity and second entity are not aligned.

12. The knowledge graph construction device according to claim 9, wherein the first attribute comprises a key attribute and a non-key attribute, and the performing entity alignment processing on the first entity comprises:
determining whether a second attribute the same as the key attribute exists in the knowledge graph, and if yes, determine whether attribute values corresponding to the key attribute and the second attribute are the same; and if yes, determining that the first entity and second entity are aligned, and if not, determining that the first entity and second entity are not aligned.

13. The knowledge graph construction device according to claim 8, wherein the method further comprising:
obtaining a description type of each piece of attribute information; and
performing cleansing and normalization processing on each piece of attribute information according to a standard description statement corresponding to the description type, so that attribute information being semantically the same has the same description.

14. The knowledge graph construction device according to claim 8, wherein the method further comprising: in the knowledge graph, for a second attribute used to represent a relationship between entities, determining an implied relationship between entities by using a preset chain rule, and map the implied relationship to the knowledge graph.

15. A non-transitory computer-readable storage medium storing instructions that, when execute by a processor, cause the processor to perform a method for constructing a knowledge graph, the method comprising:
obtaining structured data, wherein the structured data comprises a first entity name of a first entity and attribute information corresponding to the first entity name, and the attribute information comprises a first attribute and a first attribute value;
performing, based on a measurement of similarity between the first entity and a second entity in a knowledge graph, entity alignment processing on the first entity, wherein the measurement of similarity comprises at least one of the following types: measurement of a character similarity, and measurement of an attribute similarity; and
importing the structured data into the knowledge graph based on the entity alignment, wherein the importing comprises:
when the entity alignment indicates that the first entity is aligned with the second entity, and attribute alignment is performed on the first attribute of the first entity and a second attribute of the second entity, determining whether the second attribute exists in the knowledge graph;
if the second attribute does not exist in the knowledge graph, importing the first attribute and the first attribute value to the second entity; and
if the second attribute exists in the knowledge graph:
when the first attribute is a single-value attribute, determining whether the first attribute value corresponding to the first attribute conflicts with a second attribute value corresponding to the second attribute, and
if the first attribute value does not conflict with the second attribute value, performing deduplication processing, or if the first attribute value conflicts with the second attribute value, when a reliability degree of the first attribute value is higher than a reliability degree of the second attribute value, importing the first attribute value to the second entity, and deleting the second attribute value; or
when the first attribute is a multi-value attribute, and comprises a plurality of first attribute values that do not conflict with the second attribute value, determining, in the plurality of first attribute values, an attribute value different from the second attribute value, and importing the determined attribute value to the second entity.

16. The non-transitory computer-readable storage medium according to claim 15, wherein the performing, based on the measurement of similarity between the first entity and the second entity in the knowledge graph, entity alignment processing on the first entity comprises:
determining, according to a type of a data source of the structured data, a measurement type for performing similarity processing between the first entity and the second entity in the knowledge graph; and
performing entity alignment processing on the first entity according to the determined measurement type.

17. The non-transitory computer-readable storage medium according to claim 15, wherein the performing entity alignment processing on the first entity according to the determined measurement type comprises:
determining whether a child node and a parent node of the first entity are the same as a child node and a parent node of the second entity; and if yes, determining that the first entity and second entity are aligned, and if not, determining that the first entity and second entity are not aligned.

18. The non-transitory computer-readable storage medium according to claim 17, wherein the performing entity alignment processing on the first entity according to the determined measurement type comprises:
determining whether a character similarity between the first entity name and the second entity name in the knowledge graph is greater than a preset threshold; and if yes, determining that the first entity and second entity are aligned, and if not, determining that the first entity and second entity are not aligned.

\* \* \* \* \*